(12) United States Patent
Midya et al.

(10) Patent No.: US 8,278,902 B2
(45) Date of Patent: Oct. 2, 2012

(54) DC TO DC SWITCHING POWER CONVERTER CONTROLLER USING SPREAD SPECTRUM PWM

(75) Inventors: Pallab Midya, Palatine, IL (US); Siamak Abedinpour, Scottsdale, AZ (US); William J Roeckner, Carpentersville, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 458 days.

(21) Appl. No.: 12/503,807

(22) Filed: Jul. 15, 2009

(65) Prior Publication Data

US 2011/0012575 A1   Jan. 20, 2011

(51) Int. Cl.
*G05F 1/56* (2006.01)
(52) U.S. Cl. ........................................ 323/285; 375/238
(58) Field of Classification Search .......... 323/282–288, 323/271–275, 222, 224; 363/16–20, 21.07, 363/21.12, 56.07, 25, 98, 132; 455/296, 455/306, 313, 324; 327/113, 356, 357, 357.172, 327/175, 176; 375/238, 239
See application file for complete search history.

(56) References Cited

U.S. PATENT DOCUMENTS

| | | | | |
|---|---|---|---|---|
| 3,930,194 A | * | 12/1975 | Walker | 363/56.07 |
| 5,757,713 A | * | 5/1998 | Gans et al. | 365/226 |
| 5,768,118 A | * | 6/1998 | Faulk et al. | 363/72 |
| 6,680,604 B2 | * | 1/2004 | Muratov et al. | 323/285 |
| 6,819,912 B2 | | 11/2004 | Roeckner et al. | |
| 6,879,817 B1 | * | 4/2005 | Sorrells et al. | 455/296 |
| 7,130,346 B2 | * | 10/2006 | Midya et al. | 375/238 |
| 7,279,868 B2 | * | 10/2007 | Lanni | 323/222 |
| 7,738,568 B2 | * | 6/2010 | Alfano et al. | 375/258 |
| 2008/0252392 A1 | | 10/2008 | Midya et al. | |

OTHER PUBLICATIONS

"Two sided latched pulse width modulation control", P. Midya and K. Haddad, Power Electronics Specialists Conference, PESC 2000, pp. 628-633.

"Design Considerations for Very High Frequency Converters", J.M. Rivas, D. Jackson, O. Leitermann and A.D. Sagneri, Power Electronics Specialists Conference, PESC 2006, 11 pages.

* cited by examiner

*Primary Examiner* — Rajnikant Patel
(74) *Attorney, Agent, or Firm* — Patents and Licensing LLC; Daniel W. Juffernbruch (57) ABSTRACT

A switching power converter converts an input DC voltage to an output DC voltage using a switch to selectively connect an input DC voltage energy source. A switching controller controls the switch. A pulse width modulation centering signal is generated by a spread spectrum clock signal generator. An error amplifier of the switching controller generates an analog error signal based on a switching voltage measured after the switching of the switching power converter, the output voltage of the switching power converter, the pulse width modulation centering signal and a reference. A pulse width modulated signal generator generates the pulse width modulation signal to control the switch of the switching power converter based on the pulse width modulation centering signal and the analog error signal.

17 Claims, 5 Drawing Sheets

DC TO DC SWITCHING POWER CONVERTER CONTROLLER USING SPREAD SPECTRUM PWM

BACKGROUND OF THE INVENTIONS

1. Technical Field

The present inventions relate to switching power converters and, more particularly, relate to controllers for switching power converters employing pulse width modulation and electromagnetic interference reduction.

2. Description of the Related Art

Switched-Mode DC to DC converters generate and suffer from switching noise and electromagnetic interference (EMI). This problem is frequency sensitive. Distributing the switching frequency over a wider frequency spectrum is known to help to mitigate the effects from switching noise and electromagnetic interference.

One way that the switching frequency gets distributed over a wider frequency spectrum is when there is a noisy quantization clock. A dirty or noisy clock, for example, the 2 GHz clock in a laptop is not steady so it does not produce a pure 2 GHz tone. But this is not by design, just by accident. A noisy clock is not a very well controlled emission.

Another way uses a clean clock to count off a different number of cycles as in U.S. Pat. No. 7,130,346, issued Oct. 31, 2006 to Midya et al., entitled "Method and apparatus having a digital PWM signal generator with integral noise shaping."

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
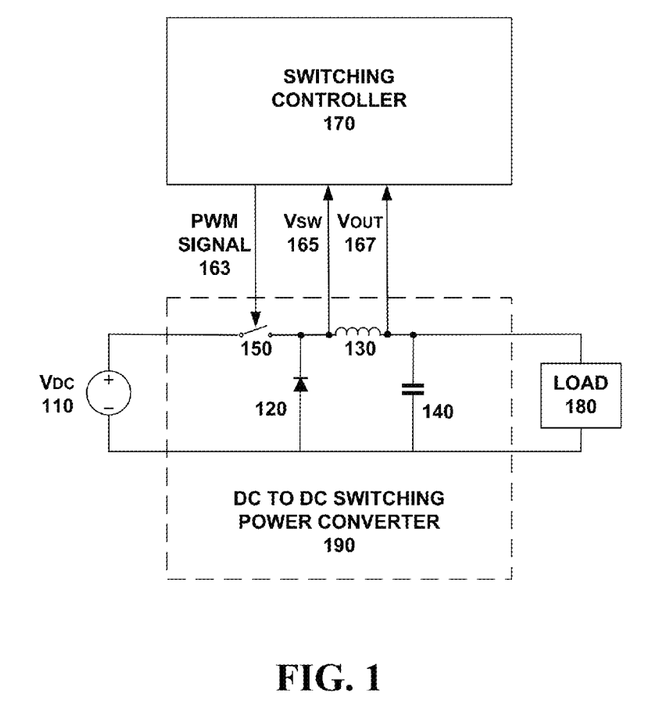
FIG. 1 illustrates a schematic diagram of a preferred application of a power converter in a power supply for powering a load according to one embodiment of the present inventions.

FIG. 1 illustrates a schematic diagram of a preferred application of a switching power converter 190 in a power supply for powering a load 180. The switching power converter 190 converts an input DC voltage to an output DC voltage using a switch 150 to selectively connect an input DC voltage energy source 110 to the components of the converter. The DC voltage energy source 110 can preferably be a battery in one embodiment. In another embodiment it might be DC volts derived from a rectified 115 volts AC.

The switching power converter 190 in one exemplary embodiment, as illustrated, a series inductor 130 and parallel capacitor 140 and diode 120 between the switch 150 and the load 180. The series inductor 130 and the parallel capacitor 140 is an energy storage device. A switching controller 170 controls the switch 150. The switching controller 170 measures the Vsw 165 and Vout 167 across the inductor 130. The switching voltage Vsw is a measurement of the waveform after the switching of the input DC voltage. Further description of the switching controller 170 will be made with reference to FIG. 2. The switching power converter 190 may have other configurations in other embodiments.

Figure 2:
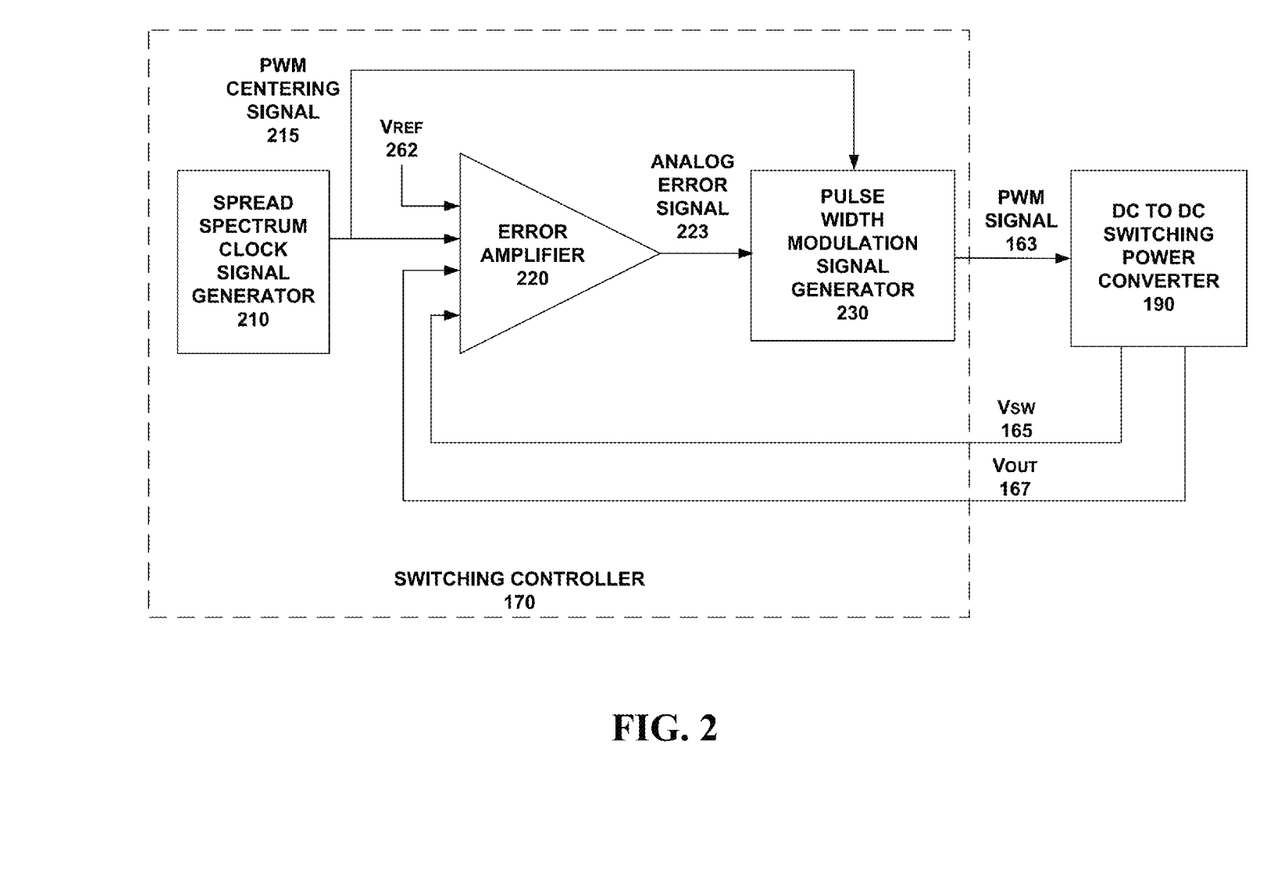
FIG. 2 illustrates a schematic diagram of a switching controller providing a PWM signal to the power converter to be controlled according to one embodiment of the present inventions.

FIG. 2 illustrates the switching controller 170 providing a PWM signal 163 to the power converter to be controlled. The power converter is preferably a DC to DC switching power converter 190.

A pulse width modulation centering signal 215 is generated by a spread spectrum clock signal generator 210. An error amplifier 220 of the switching controller generates an analog error signal 223 based on a switching voltage 165 of the switching power converter, the output voltage 167 of the switching power converter, the pulse width modulation centering signal 215 and a reference 262. A pulse width modulated signal generator 230 generates a pulse width modulation signal 163 to control the switch 150 of the switching power converter based on the pulse width modulation centering signal 215 and the analog error signal 223.

The spread spectrum clock signal generator 210 generates the pulse width modulation centering signal 215. This functions also as a system clock. The pulse width modulation centering signal 215 includes a spread spectrum clock signal of a 50% duty ratio signal. This is created by counting a clean quantization clock. The period of the signal is an even multiple of the quantization clock. The period is noise shaped from a smoothly varying reference switching frequency signal. The pulse width modulation centering signal can be generated with a varying period from cycle to cycle.

The switching frequency can be tied to the spread spectrum pulse width modulation centering signal (CPWM) 215. CPWM is an acronym for center of PWM signal. A spread spectrum pulse width modulation PWM clock signal 215 is the CPWM.

The error amplifier 220 produces an analog error signal 223 based on the spread spectrum pulse width modulation centering signal 215 and a reference voltage Vref 262 and sensed feedback Vsw 165 and Vout 167 from the power converter to be controlled. The error amplifier 220 can be built using a single operational amplifier (op-amp). A fully differential implementation is desired. Capacitors are in the feedback paths and resistors and capacitors are in the forward path. An implicit ramp signal is generated in addition to the error by integrating the pulse width modulation centering signal (CPWM) 215. The reference voltage Vref 262 is the voltage that we want the output voltage to track (Vout). Vref can also be a digitally generated pulse width modulation pulse width modulation (PWM) signal. This would allow Vref to vary using a logic command.

The pulse width modulation signal generator 230 generates a PWM signal 163 based on the analog error signal 223 from the error amplifier 220 and the spread spectrum pulse width modulation centering signal 215. Further description of the pulse width modulation signal generator 230 will be made with reference to FIG. 3.

Figure 3:
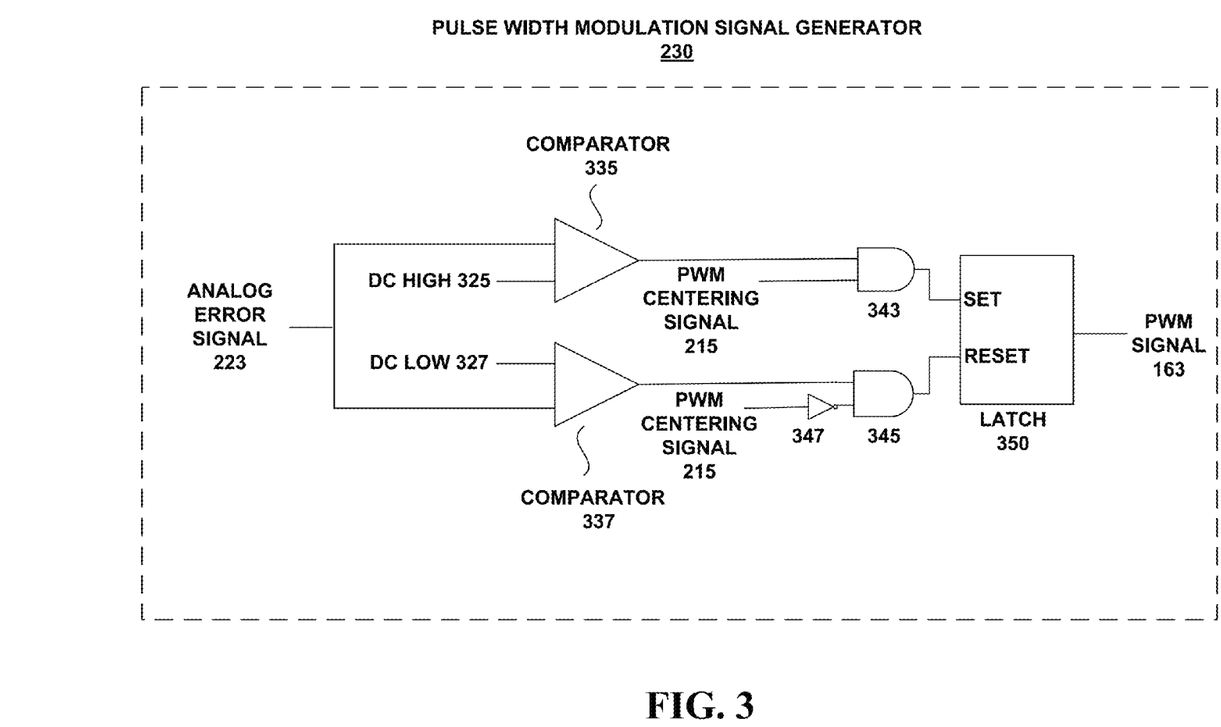
FIG. 3 illustrates a schematic diagram of a pulse width modulation signal generator for the switching controller according to one embodiment of the present inventions.

FIG. 3 illustrates a schematic diagram of a pulse width modulation signal generator 230 for the switching controller 170. The pulse width modulation signal generator 230 can be made from two comparators 335 and 337 to create a logic signal from the analog error signal 223. DC high upper and low lower limits are determined by DC high 325 and DC low 327 inputs to respective comparators 335 and 337. By using logic gates 343 and 345 and latch 350, the number of transitions is limited and the switching frequency is enforced every half cycle. This assures the setting and resetting by the latch 350 occur aligned with the pulse width modulation centering signal. Under steady state condition the center of the PWM high signal matches the high to low transition of the pulse width modulation centering signal (CPWM). The center of the pulse width modulation PWM low signal matches the low to high transition of the pulse width modulation centering signal. The pulse width modulation centering signal can be called the centering pulse width modulation signal since it sets the centers of the PWM pulse independent of duty ratios.

The pulse width modulation centering signal has two main characteristics. One characteristic is an approximately 50% duty ratio and another characteristic is a varying period from cycle to cycle. Typically the variation in the period is a small percentage of the average period.

Many circuits can be used to generate the above characteristics of the pulse width modulation centering signal. One example of how to generate the pulse width modulation centering signal is by way of digital logic circuits. One digital logic implementation might be gates and counters. Another example of how to generate the pulse width modulation centering signal is to use the PWM modulator in US Patent Publication No. 20080252392 entitled "Discrete Dithered Frequency Pulse Width Modulation" published on Oct. 16, 2008 by Midya et al. having a common inventor with the present inventions. It is copending with the present application. It discloses a switching amplifier using spread spectrum digital PWM.

Figure 4:
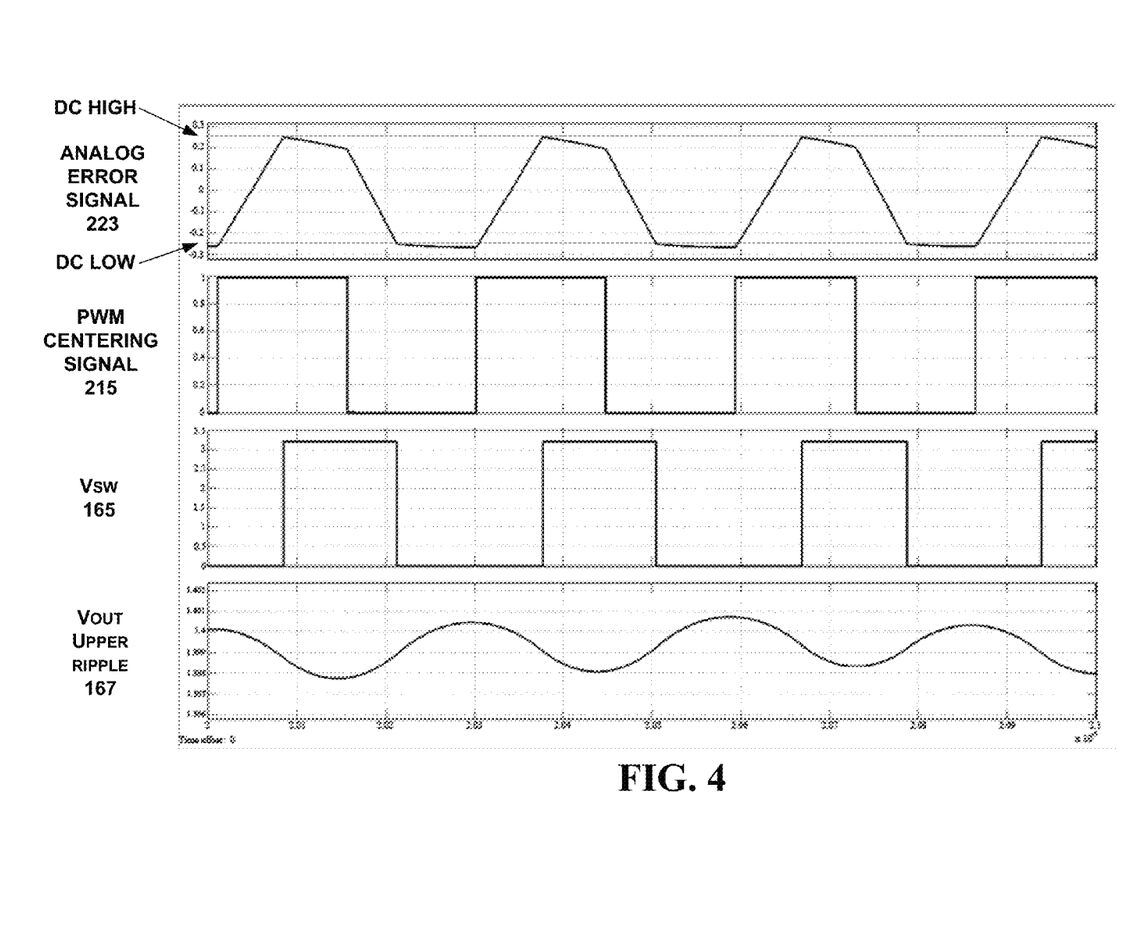
FIG. 4 illustrates signal timing diagrams of an analog error signal, a PWM centering signal, Vsw and Vout according to one embodiment of the present inventions.

FIG. 4 illustrates side-by-side signal timing diagrams of an analog error signal 223, the PWM centering signal 215, the Vsw 165, and the upper ripple of the Vout 167. The analog error signal 223 is illustrated at the top of FIG. 4 between DC high upper limits and DC low lower limit. The DC high upper limits and DC low lower limit are determined in the one exemplary embodiment of FIG. 3 by the inputs DC high 325 and DC low 327 to the respective of the comparators 335 and 337.

The PWM centering signal 215 is illustrated near the middle of FIG. 4. The Vsw 165 is illustrated near the middle of FIG. 4. It is noteworthy that the downward transition of the PWM centering signal 215 lines up near a center of the high portion of Vsw 165. Similarly, the upward transition of the PWM centering signal 215 lines up near a center of the low portion of Vsw 165. It is also noteworthy that the PWM centering signal 215 has an approximately 50% duty ratio whereas the duty ratio of the Vsw 165 can very significantly from 50%.

The Vout 167 is illustrated at the bottom of FIG. 4. The view of the Vout 167 is zoomed in to show an upper ripple on a top of the signal.

Figure 5:
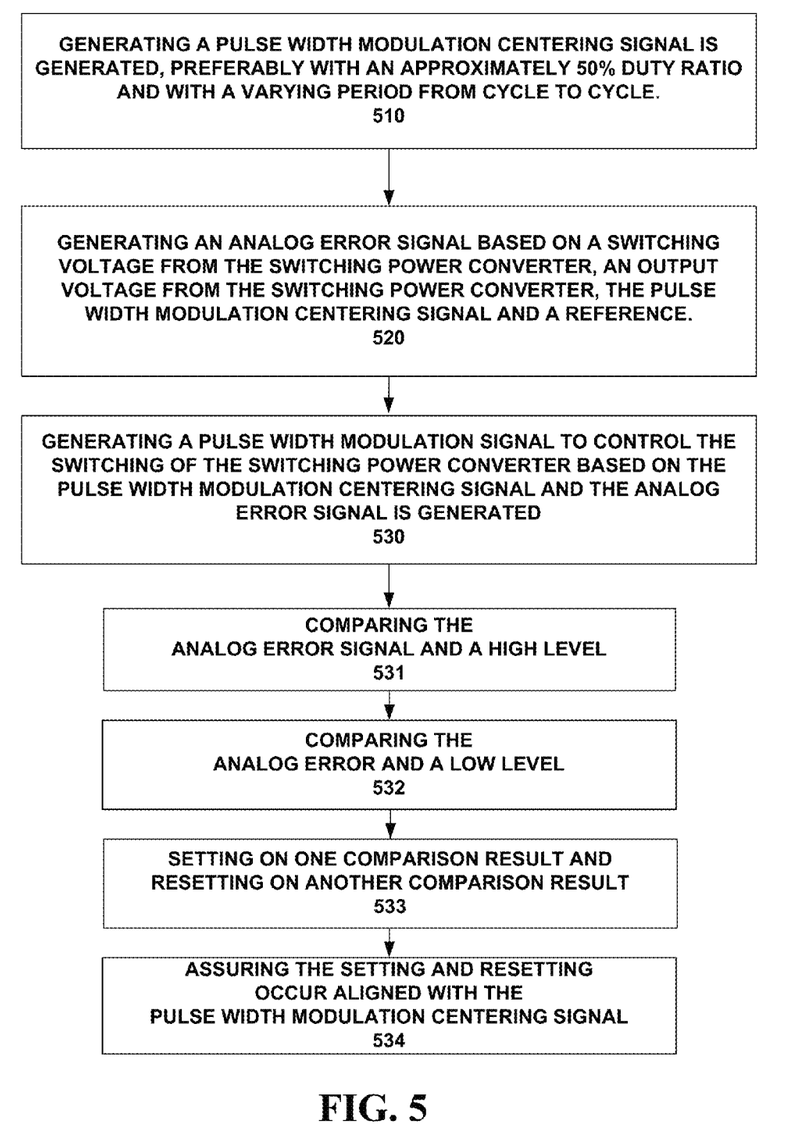
FIG. 5 illustrates a flow diagram for controlling switching of a switching power converter to convert an input DC voltage to an output DC voltage according to one embodiment of the present inventions.

FIG. 5 illustrates a flow diagram for controlling switching of a switching power converter to convert an input DC voltage to an output DC voltage. In step 510 a pulse width modulation centering signal is generated. The pulse width modulation centering signal generated in step 510 can preferably have an approximately 50% duty ratio with a varying period from cycle to cycle. An analog error signal is generated in step 520 based on a switching voltage from the switching power converter, an output voltage from the switching power converter, the pulse width modulation centering signal and a reference. A pulse width modulation signal to control the switching of the switching power converter based on the pulse width modulation centering signal and the analog error signal is generated in step 530. This step 530 of generating the pulse width modulation signal to control the switching can optionally comprise the substeps of 531-534. In substep 531 the analog error signal and a high level are compared. In substep 532 the analog error and a low level are compared. Setting of the latch occurs on one comparison result and resetting of the latch occurs on another comparison result in substep 533. Substep 534 assures that the setting and resetting occur aligned with the pulse width modulation centering signal.

The signal processing techniques such as those of the signal controller 170 can be implemented on one or more digital signal processors (DSPs) or other microprocessors. Nevertheless, such techniques could instead be implemented wholly or partially as discrete components including op-amps, comparators, gates and latches. Further, it is appreciated by those of skill in the art that certain well known digital processing techniques are mathematically equivalent to one another and can be represented in different ways depending on choice of implementation.

The present inventions have many advantages. The controller provides for agile control of PWM with spread spectrum pulse width modulation PWM. The feedback involves a single op-amp. Robust control is provided with no need for tuning. Feedback comes from output and switch voltages. Both rising and falling edges are modulated. It is suitable for synchronization of multiple converters. No explicit ramp signal is needed for at least some embodiments. The pulse width modulation centering signal (CPWM) can be used both for maintaining PWM frequency and for synchronization of multiple signals. Analog to digital converters are not needed for at least some embodiments. A high speed quantization clock is not required. Tuning R-C time constants are not needed for at least some embodiments. The spectrum of pulse width modulation PWM can be set by the spread spectrum pulse width modulation PWM clock signal.

Efficient switched mode DC to DC converters are useful replacements for linear regulators in many portable applications to improve battery life. In a transceiver section of portable multi-media terminals, the electromagnetic interference may de-sense the receiver and create spurious spectrum at the switching frequency plus or minus the transmit frequency. A proper noise mitigation technique will allow the use of switched mode DC to DC converters in these applications and as a result reduce the current drawn from the battery.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Any letters designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A converter for converting an input DC voltage to an output DC voltage, the converter comprising:
   a switching power converter for converting an input DC voltage to an output DC voltage comprising a switch to selectively connect the input DC voltage to an energy storage device and provide the output DC voltage therefrom; and
   a switching controller operatively connected to the switching power converter to control the switch, wherein the switching controller comprises:
   a spread spectrum clock signal generator for generating a pulse width modulation centering signal;
   an error amplifier operatively connected to receive the pulse width modulation centering signal from the spread spectrum clock signal generator, to receive a switching voltage measured after the switching of the switching power converter, to receive an output voltage from the switching power converter for generating an analog error signal based on the switching voltage, the output voltage, the pulse width modulation centering signal and a reference; and
   a pulse width modulated signal generator operatively connected to the spread spectrum clock signal generator, the error amplifier and the switching power converter to generate a pulse width modulation signal to control the switch of the switching power converter therefrom based on the pulse width modulation centering signal and the analog error signal.

2. A converter according to claim 1, wherein the pulse width modulated signal generator comprises:
   a first comparator operatively connected to receive the analog error signal from the error amplifier and compare it with a high level;
   a second comparator operatively connected to receive the analog error signal from the error amplifier and compare it with a low level; and
   a latch operatively connected to the first comparitor and the second comparitor to set on one comparison result and reset on another comparison result and generate the pulse width modulation signal to control the switch of the switching power converter.

3. A converter according to claim 2, wherein the pulse width modulated signal generator further comprises a gating circuit operatively connected to the fist comparator, the second comparator and the latch for assuring the set and reset of the latch occur aligned with the pulse width modulation centering signal.

4. A converter according to claim 1, wherein the spread spectrum signal generator generates the pulse width modulation centering signal with an approximately 50% duty ratio.

5. A converter according to claim 4, wherein the spread spectrum signal generator generates the pulse width modulation centering signal with a varying period from cycle to cycle.

6. A converter according to claim 1, wherein the spread spectrum signal generator generates the pulse width modulation centering signal with a varying period from cycle to cycle.

7. A converter according to claim 1, wherein the switching voltage is a waveform measured after the switching of the input DC voltage.

8. A method of controlling switching of a switching power converter to convert an input DC voltage to an output DC voltage, the method comprising the steps of:
   (a) generating a spread spectrum, pulse width modulation centering signal;
   (b) measuring a switching voltage after the switching of the switching power converter;
   (c) generating an analog error signal based on the switching voltage measured in said step (b), an output voltage from the switching power converter, the spread spectrum, pulse width modulation centering signal generated in said step (a) and a reference;
   (d) generating a pulse width modulation signal based on the spread spectrum, pulse width modulation centering signal generated in said step (a) and the analog error signal generated in said step (c); and
   (e) controlling the switching of the switching power converter using the pulse width modulation signal generated in said step (d).

9. A method according to claim 8, wherein said step (de) of generating the pulse width modulation signal to control the switching comprises the substeps of:
   (d1) comparing the analog error signal and a high level;
   (d2) comparing the analog error and a low level; and
   (d3) setting on one comparison result and resetting on another comparison result.

10. A method according to claim 9, wherein the substeps further comprise the step of (d4) assuring the setting and resetting of said step (d2) and said step (d3) occur aligned with the spread spectrum, pulse width modulation centering signal.

11. A method according to claim 8, wherein said step (a) of generating the spread spectrum, pulse width modulation centering signal generates the spread spectrum, pulse width modulation centering signal with an approximately 50% duty ratio.

12. A method according to claim 11, wherein said step (a) of generating the spread spectrum, pulse width modulation centering signal generates the spread spectrum, pulse width modulation centering signal with a varying period from cycle to cycle.

13. A method according to claim 8, wherein said step (a) of generating the spread spectrum, pulse width modulation centering signal generates the spread spectrum, pulse width modulation centering signal with a varying period from cycle to cycle.

14. A method according to claim 8, wherein the switching voltage is a waveform measured after the switching of the input DC voltage.

15. A switching controller operatively connected to a switching power converter to control the switching power converter, the switching power controller for converting an input DC voltage to an output DC voltage, wherein the switching controller comprises:
   a spread spectrum clock signal generator for generating a pulse width modulation centering signal;
   an error amplifier operatively connected to receive the pulse width modulation centering signal from the spread spectrum clock signal generator, to receive a switching voltage measured after the switching of the switching power converter, to receive an output voltage from the switching power converter for generating an analog error signal based on the switching voltage, the output voltage, the pulse width modulation centering signal and a reference; and
   a pulse width modulated signal generator operatively connected to the spread spectrum clock signal generator, the error amplifier and the switching power converter to generate a pulse width modulation signal to control the switch of the switching power converter therefrom based on the pulse width modulation centering signal and the analog error signal.

16. A switching controller according to claim 15, wherein the switching power converter includes a switch to selectively connect the input DC voltage to an energy storage device and provide the output DC voltage therefrom.

17. A switching controller according to claim 16, wherein the switching voltage is a waveform measured after the switching of the input DC voltage.

* * * * *

UNITED STATES PATENT AND TRADEMARK OFFICE
CERTIFICATE OF CORRECTION

PATENT NO. : 8,278,902 B2  
APPLICATION NO. : 12/503807  
DATED : October 2, 2012  
INVENTOR(S) : Pallab Midya et al.

Page 1 of 1

It is certified that error appears in the above-identified patent and that said Letters Patent is hereby corrected as shown below:

In claim 9, line 1, "step (de)" should read -- step (d) --.

Signed and Sealed this
Fourth Day of December, 2012

David J. Kappos
*Director of the United States Patent and Trademark Office*

UNITED STATES PATENT AND TRADEMARK OFFICE
CERTIFICATE OF CORRECTION

PATENT NO. : 8,278,902 B2
APPLICATION NO. : 12/503807
DATED : October 2, 2012
INVENTOR(S) : Pallab Midya et al.

It is certified that error appears in the above-identified patent and that said Letters Patent is hereby corrected as shown below:

Column 6, line 20 (claim 9, line 1) "step (de)" should read -- step (d) --.

This certificate supersedes the Certificate of Correction issued December 4, 2012.

Signed and Sealed this
First Day of January, 2013

David J. Kappos
*Director of the United States Patent and Trademark Office*